United States Patent [19]

Richards

[11] 3,818,220

[45] June 18, 1974

[54] VARIABLE DEPTH LAMINAGRAPHY

[76] Inventor: Albert G. Richards, 395 Rock Creek Dr., Ann Arbor, Mich. 48104

[22] Filed: Nov. 3, 1971

[21] Appl. No.: 195,346

[52] U.S. Cl. .............................. 250/61.5, 250/65 R
[51] Int. Cl. .......................................... G03b 41/16
[58] Field of Search............................ 250/61.5, 65

[56]  References Cited
UNITED STATES PATENTS

| | | | |
|---|---|---|---|
| 2,196,618 | 4/1940 | Watson............................. | 250/61.5 |
| 3,499,146 | 3/1970 | Richards........................... | 250/61.5 |
| 3,499,146 | 3/1970 | Richards........................... | 250/61.5 |
| 3,524,057 | 8/1970 | Hammonds......................... | 250/50 |
| 3,091,692 | 5/1963 | Verse................................ | 250/61.5 |
| 3,631,244 | 12/1971 | Bergstedt........................... | 250/61.5 |

Primary Examiner—Archie R. Borchelt
Assistant Examiner—C. E. Church
Attorney, Agent, or Firm—Gerald E. McGlynn, Jr. et al.

[57] ABSTRACT

A method and apparatus for obtaining laminal detail within a three-dimensional object utilizing circular laminagraphy, that is, a series of exposures to penetrating rays recorded seriatim on discrete films as a ray-source and object are relatively moved circularly in reference to the film. The apparatus mounts the film and object for recording, and mounts the respective recorded data and moves each suitably with respect to the other to generate a series of laminal detail progressively through the object.

7 Claims, 11 Drawing Figures

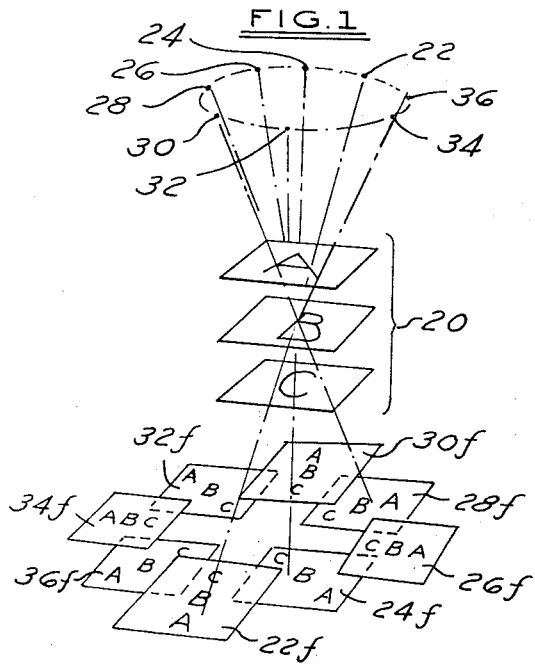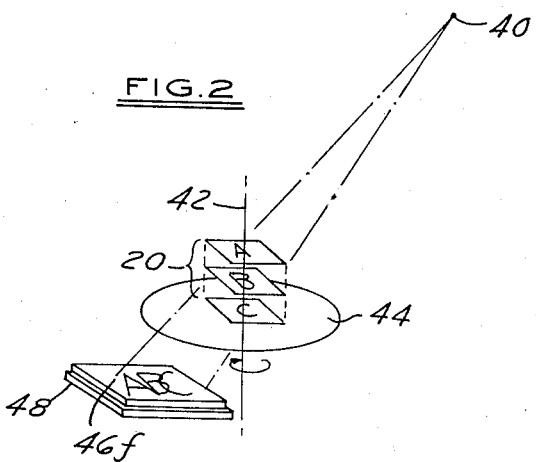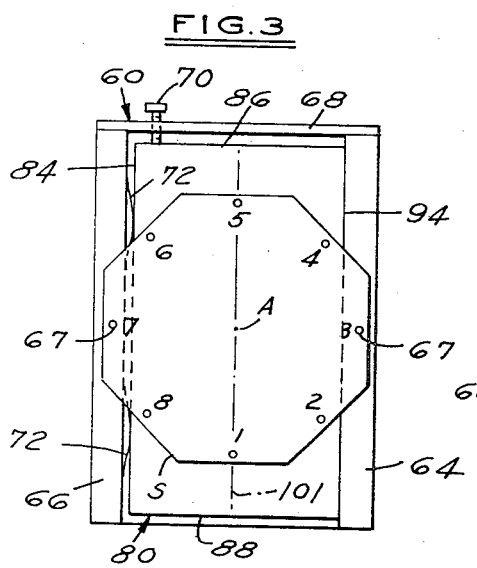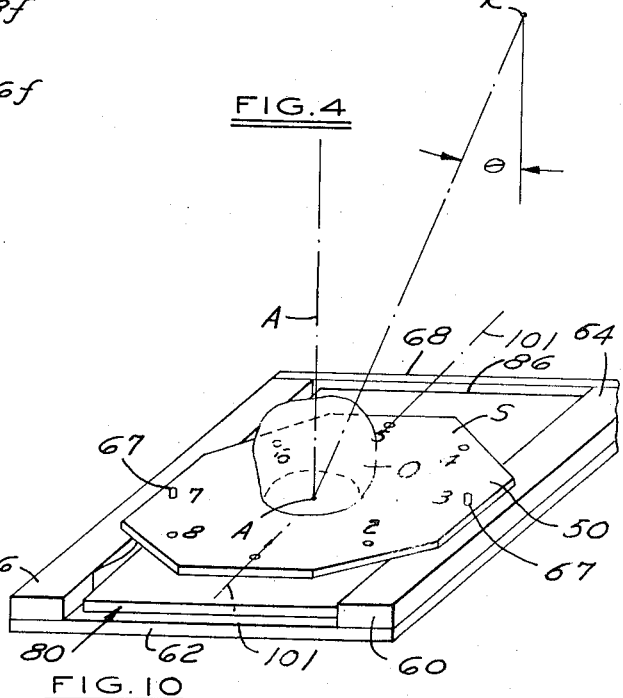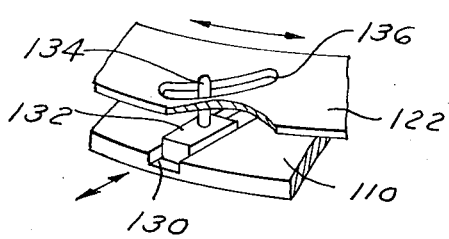

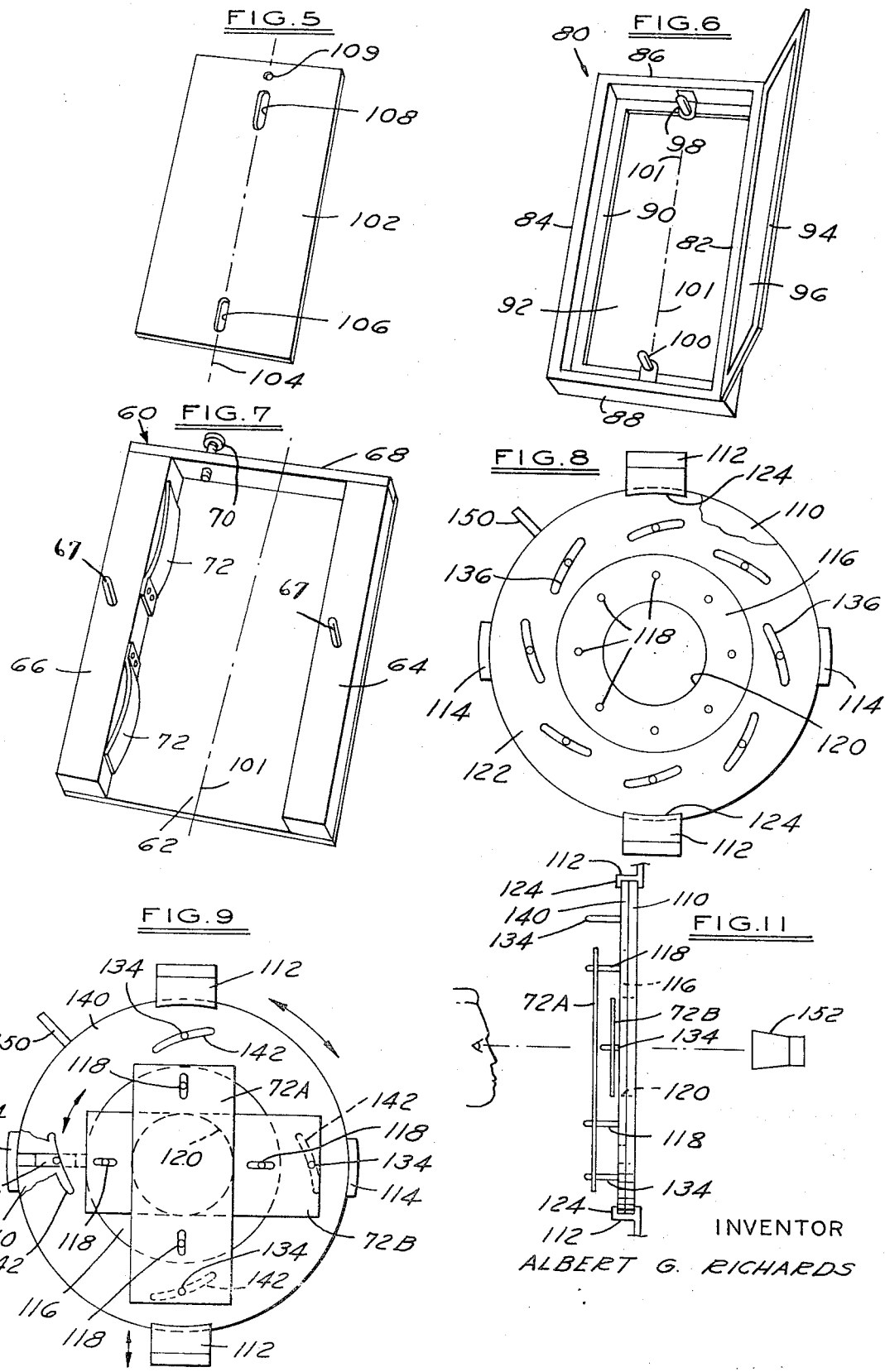

VARIABLE DEPTH LAMINAGRAPHY

This invention relates to Variable Depth Laminagraphy and more particularly to a method and apparatus for achieving circular laminagraphy.

Reference is made to my U. S. Pat. No. 3,499,146, dated Mar. 3, 1970, which discloses the general principles of laminagraphy as applied to three-dimensional objects.

The present invention has the object of providing a method and apparatus for achieving laminagraphic recording and viewing, utilizing circular positioning in the exposure sequence and an appropriate relative motion of the multiple developed exposures for readout.

While the term "variable depth laminagraphy" has been commonly used in connection with the production of laminal images, the process may also be called "dynamic tomography" and the system includes the use of penetrating radiation such as X-rays in connection with normally radiopaque materials in three dimensions.

More particularly, the invention relates to a system of moving a source and film in the circular form of tomography while the object remains stationary or optionally rotating the object while the source and the film positions remain fixed. The term "object" or "subject" can mean any animate or inanimate thing which is subjected to a radiation source and from which a series of radiographic images are to be obtained. Apparatus for facilitating the recording and readout of tomographic images is described in connection with this disclosure.

Other objects and features of the invention illustrating the principles of operation and use will be apparent in the following description and claims in which the best mode of the invention presently contemplated is set forth.

DRAWINGS accompany the disclosure and the various views thereof may be briefly described as:

FIG. 1, a diagrammatic presentation of the manner in which a particular object will be subjected to a series of exposures of radiation.

FIG. 2, a diagrammatic presentation of an alternative method of exposure.

FIG. 3, a plan view of a holding device for implementing the exposure technique of FIG. 2.

FIG. 4, a modified perspective view of the apparatus shown in FIG. 3.

FIG. 5, a view of a specially formed film for use with the apparatus.

FIG. 6, a view of a film cassette.

FIG. 7, a view of a cassette holder for a film cassette.

FIG. 8, a plan view of an apparatus for viewing exposed film.

FIG. 9, a modified apparatus with a reduced number of stations for simplifying the presentation.

FIG. 10, a segmental view illustrating a detail of the slide element of FIG. 9.

FIG. 11, a side view of the apparatus shown in FIG. 9.

With reference to the drawings, in FIG. 1, there is shown a diagrammatic presentation of a circular laminagraphic or tomographic system. The object is illustrated at 20 having three arbitrary selected planes A, B and C and at the top of the figure there is shown a plurality of source positions 22, 24, 26, 28, 30, 32, 34, and 36, these being eight positions arranged in a circle which has its center on the vertical axis of the object 20 and lying in a plane normal to that axis.

Various films are arranged sequentially around in a circle below the object 20, there being a film for each exposure position, for example, films 22f, 24f, 26f, 28f, 30f, 32f, 34f, and 36f. Each of the films will be exposed sequentially so that there will be no double exposure of the films. In this way a series of films are exposed to record the data of planes A, B and C at the respective positions in the manner indicated in the drawings. In readout, the films are overlayed and moved relative to each other to delineate the planes sought to be viewed.

In FIG. 2, a modified system is shown diagrammatically wherein a fixed source 40 is disposed at an angle to the axis 42 of the object 20, the object resting on a turntable or stage 44 which can be rotated about the axis of the object. Respective films 46f can be disposed at the station 48 as the turntable 44 is rotated between each particular exposure.

Apparatus for accomplishing the exposure is shown in FIGS. 3 to 7. A support frame 60, shown in FIG. 7, has a bottom plate 62, two side frame supports 64 and 66, each having an upstanding locator pin 67, and a top cross member 68 which has a stop screw 70. Leaf springs 72 are spaced along side support 66 to locate a cassette 80 illustrated in FIG. 6. This cassette 80 has side frame members 82 and 84 connected by cross-end members 86 and 88; a front frame panel 90 which is formed of radioluscent material edges the frame and may be used to support an image intensifying screen 92. A cover panel frame 94 hinged to side member 82 may also be used to support an image intensifying screen 96. Locating pins 98 and 100 are suitably mounted on brackets on the respective end members 86 and 88 to extend into the space enclosed by the frame.

These pins on an axis 101 cooperate to hold a film sheet 102 illustrated in FIG. 5 having a central axis 104 and two locator slots 106 and 108 on that axis. At the end of slot 108 is also a hole 109 on axis 104. Pin 98 in cassette 80 is received in hole 109 and pin 100 is received in slot 106. Thus, when a film sheet is introduced into cassette 80, it will be sandwiched between frame panel 90 and a possible intensifying screen 92 on one side and the cover frame 94 and a possible intensifying screen 96 on the other side.

These two film holder devices, namely, the support frame 60 and the included cassette 80 serve as a mount for an object stage plate S, FIG. 3, formed of material pervious to radiation rays and which is circular or polygonal in shape around an axis A. The example in FIG. 3 is octagonal in shape with four pairs of position holes numbered 1 to 8. These pairs of holes cooperate with the spaced pins 67. As viewed in FIG. 3, holes 3 and 7 are mounted over the pins 67 bringing the axis A in coincidence with the axis 101 of the cassette 80 and frame 60. The stage S serves as a support for an object 0 to be exposed to a suitable ray source R offset from vertical axis A by the angle $\theta$ as illustrated in FIG. 4. The stage with the object 0 can readily be lifted and rotated to consecutive pairs of opposed holes 1 to 8. These holes are preferably marked on the stage S with lead or other radiation absorbing material such that the various positions will be recorded on the film each time a shot is taken.

The apparatus is such that the axis 104 of film 102 is concident with the axis of cassette 101 of the cassette 80 and the support frame 60. All of these support elements lie preferably close to the plane of the stage S.

It will be seen that in connection with the use of the apparatus shown in FIGS. 3 and 4, the object 0 will be exposed to radiation from the point source R eight different times and each time a different plate will be utilized in the cassette 80. When the multiple exposures are made and the film has been properly developed, the readout may take place.

In FIG. 8, a system has been shown for facilitating readout. It consists of a base plate 110 supported in opposed brackets 112 stabilized by side plates 114. On the base plate 110 is a flat ring 116 fixed to the base plate and carrying a plurality of eight pins 118. This ring has an opening 120 which serves as a light window. Rotatably mounted around the ring 116 on the base plate 110 is an outer actuator ring 122 which is held captive on the support ring 116 by overlap flanges 124 on brackets 112.

The base plate 110, as shown in FIG. 10, is provided with a series of radial surface slots 130 in which are mounted slide blocks 132 each carrying an upright pin 134. These pins pass through curved slots 136 formed in circumferentially spaced relationship around the ring 122. It will thus be seen that rotation of the ring 122 relative to the ring 116 in the base plate 110 will cause the slide blocks 132 to move radially inward or outward depending on the direction of rotation and this will carry the pins 134 radially in the same direction.

This apparatus illustrated in FIG. 8 is intended to provide a support for eight films which result from the sequential exposures described in connection with FIGS. 3 and 4. To simplify the explanation, FIGS. 9 and 11 illustrate a similar apparatus wherein only two films are mounted.

In FIG. 9, a ring 140 is mounted on base 110, this ring having four curved slots 142 circumferentially arranged and four pins 134 suitably mounted on slide blocks in the base. Film plates 72A and 72B are mounted on the apparatus. Film 72A has the end hole 109 perforated by the pin 134 and the slots 106 and 108 perforated by the respective pins 118 on the inner ring 116. Thus, the film will be guided on the pins 118 while the pin 134 in each case will serve as the actuator which will shift the film diametrically across the window opening 120. Film 72B is similarly located by the slots and holes shown in FIG. 5 on the respective pins 118 and 134.

Thus, it will be seen that rotation of the outer ring 140 by a suitable handle 150 will cause the film 72A and 72B to move at right angles to each other in a sliding relationship.

A side view of this assembly is shown in FIG. 11 where a light source 152 directs light to the window 120 where an observer may view the overlapping films as they are shifted relative to each other. This cross shifting will produce the various laminagraphic views depending on the relative position of the films and thus delineate respective horizontal planes through an object O depending on such relative position.

When all eight of the films are mounted on an apparatus such as shown in FIG. 8, a rotation of the outer ring 122 by the handle 150 would cause all of the eight films to shift relative to each other simultaneously, each moving diametrically in response to an actuator pin 134. Thus, in the manner described, the various laminal planes may be sharply delineated depending on the position of rotation. This enables close inspection of data throughout the three-dimensional object as desired.

Although this disclosure includes a method of "variable depth laminagraphy" in which eight films are exposed with the ray source describing a circular pattern about the axis of rotation of the stage and the subject, or, alternatively, the object being rotated eight times relative to a fixed source, the method is not limited to either the use of eight films or the use of a circular ray source pattern. Any number of films greater than two will produce the same effect, as will any set of ray source positions, provided that (a) the ray source positions lie in a plane perpendicular to the axis of rotation of the source or the stage and object; (b) the viewer is constructed in such a way that the pins 118 and 134 are in the same angular positions as the stage was when the exposures were made; and (c) the relative radial positions and motions of the pins 134 are proportional to the distance of the ray source from its axis of rotation 42 when the films were exposed.

I claim:

1. The method of producing a laminagraphic record of three-dimensional objects which comprises supporting an object to be radiographed between a source of penetrating radiation and a film holder, said source being spaced from an axis extending through a point adjacent said object and perpendicular to a sheet of film in said holder, said source being directed toward said object so that radiation therefrom penetrates said object and impinges upon a sheet of film in said holder to expose said film, exposing a plurality of films one at a time in said holder with said object being disposed in a different angular position about said axis for each exposure whereby said plurality of films may be developed to produce a set of radiographs which may be superimposed and shifted relative to each other to produce a clear image of any selected laminal plane in said object.

2. The invention as defined in claim 1 in which the step of supporting said object is executed with said source being spaced from an axis extending through said object.

3. The invention as defined in claim 1 wherein said step of exposing a plurality of films one at a time is executed with said object being supported in the same translational position for each exposure.

4. The invention as defined in claim 3 which includes the additional step of disposing a different ray absorbing indicia means adjacent said object for each exposure.

5. Apparatus for laminagraphically viewing a set of radiographs each of which was exposed with the object being in a different angular position relative to a source of penetrating radiation about an axis extending through a point adjacent the object and perpendicular to the film plane with the source of penetrating radiation being offset from said axis, said apparatus comprising means for supporting the set of radiographs in overlying relation with each other and with each radiograph angularly oriented in accordance with the angular orientation of said object relative to said source when the radiograph was exposed, means for holding said set of radiographic records in translational positions in which the recorded image on each radiograph of a given point in said object coincides with such image on each other radiograph of the set, means for moving all of said radiographs along respective lines extending in directions corresponding to the angular orientation of the object relative to the source when the radiograph was exposed, the improvement comprising a plurality of drive elements corresponding respectively to said radiographs and being movable along said directions, and cam means coacting with each of said drive elements simultaneously to shift said radiographs along said directions.

6. The invention as defined in claim 5 wherein said cam means comprises a plate rotatable around an axis and having a plurality of curved slots therein, each of said slots corresponding respectively to one of said drive elements and extending generally obliquely of radial line extending from said axis through the slot.

7. The invention as defined in claim 6 wherein said drive elements comprise drive pins mounted on slide blocks, and a base plate having radially extending grooves for slidably receiving said blocks.

* * * * *